United States Patent [19]
Hall, III et al.

[11] Patent Number: 6,158,657
[45] Date of Patent: Dec. 12, 2000

[54] SYSTEM AND METHOD FOR OFFERING AND PROVIDING SECURED CREDIT CARD PRODUCTS

[75] Inventors: Sheldon F. Hall, III; Ivan T. Stoikoff, both of Arlington, Va.

[73] Assignee: Capital One Financial Corporation, Falls Chuch, Va.

[21] Appl. No.: 09/389,597

[22] Filed: Sep. 3, 1999

[51] Int. Cl.[7] .................................................. G06K 5/00
[52] U.S. Cl. .......................................... 235/380; 235/379
[58] Field of Search ..................................... 235/379, 380

[56] References Cited

U.S. PATENT DOCUMENTS 6,085,976   7/2000   Sehr ........................................ 235/380

*Primary Examiner*—Harold I. Pitts

*Attorney, Agent, or Firm*—Finnegan, Henderson, Farabow, Garrett & Dunner, LLP

[57] ABSTRACT

A system and method is provided for offering and providing secured credit card products. The disclosed systems and method provide a secured credit card product that is offered to a select group of potential customers. The offer may indicate both the required security deposit and the maximum credit limit that the customer may qualify for in exchange for the security deposit. When each customer response to the offer is received, the actual credit limit for the secured credit card is determined based on the individual's credit history and other credit-related factors. After determining the credit limit, a customer account is established and the customer is notified of his/her new account. This notification may include providing the new account number, credit limit and other pertinent account information, as well as issuing one or more secured credit cards represented with plastic card-like members.

34 Claims, 5 Drawing Sheets

SYSTEM AND METHOD FOR OFFERING AND PROVIDING SECURED CREDIT CARD PRODUCTS

BACKGROUND OF THE INVENTION

I. Field of the Invention

The present invention is related to credit card products and to systems and methods for offering and providing such products. More particularly, the invention relates to systems and methods that minimize risk to credit card issuers and increase the level of response to offers for secured credit card products.

II. Background and Material Information

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions). With a credit card, an authorized customer or cardholder is capable of purchasing services and/or merchandise without an immediate, direct exchange of cash. With each purchase, the cardholder incurs debt which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred.

The spending power of a credit card (i.e., the total amount of funds available to the cardholder at any particular time for making purchases) is typically limited to a particular amount predetermined by the issuer of the card. This amount is commonly referred to as the "credit limit" of the credit card. The size of the issuer-imposed credit limit is generally based on a number of non-exclusive factors, the most important of which are often the cardholder's earning capacity and the cardholder's credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance", while the remaining or available balance of the credit limit is typically called the "available balance" and reflects the dynamically adjusted current spending power of the credit card. The cardholder may increase the available balance up to the credit limit, by paying to the issuer (or its representative) the entire outstanding balance or a fractional portion thereof.

Credit cards are typically structured according to one of two general varieties: unsecured or secured. Of these two varieties, unsecured credit cards are perhaps the most common type of credit card product. Unsecured credit cards are aimed at customers with excellent or good credit history, and are distinct from secured credit cards in that they do not require any type of security deposit from the cardholder. The issuer of an unsecured credit card may offer potential customers a particular unsecured credit card by disclosing the terms and conditions of the credit card product (e.g., annual fees, interest rate(s) and finance charges, etc.) and the credit limit of the credit card that may reach a stated maximum upon qualification. When a credit card application is returned by a customer, the amount of the credit limit is generally determined by the issuer based on various factors, such as the customer's credit history and earning capacity.

Secured credit cards are an alternative to unsecured credit cards and are designed for customers with poor or bad credit history. Secured credit cards differ from unsecured credit cards in that they require a security deposit from the customer before a credit card account can be established. There are generally two types of secured credit card products: ratio products and fixed line products. Ratio products are credit cards that are offered to potential customers with a variable credit limit that is based on an indicated ratio or multiple of a security deposit to be provided by the customer. In response to an offer from the credit card issuer, the customer may choose a security deposit ranging between a stated minimum and maximum amount to obtain a desired credit limit. In contrast, fixed line products are secured credit cards that are offered to potential customers with a fixed credit limit and a predetermined, security deposit amount. The offer for a fixed line product can indicate both the required security deposit amount and the fixed credit limit. Since the issuer of a fixed line product does not vary the credit limit for potential customers, the customer can only receive the indicated credit limit in exchange for providing the security deposit.

Although secured credit cards have enabled credit card issuers to provide credit card products to individuals with poor credit, these types of credit card products suffer from several drawbacks. For example, the main disadvantage of ratio products is that certain customers may seek the maximum credit limit by providing a larger security deposit, but still default on their payments. As a result, a credit card issuer may be exposed to unsatisfactory levels of financial risk. While such risk can be minimized by providing fixed line products, these types of secured credit card products typically do not receive a good level of response, since the fixed credit limit is normally lower and/or determined based on the entire group of potential customers that receive the offers from the issuer. This results in a fixed credit limit being offered to certain individuals that could potentially qualify for a higher credit limit.

In view of the foregoing, there is presently a need for an improved system and method for offering and providing secured credit card products. For example, a need exists for a secured credit card product that minimizes the risk to credit card issuers while attracting a larger number of potential customers having a poor or bad credit history. There is also a need for an improved system and method for offering secured credit cards that provides a level of response that is comparable to that of unsecured credit cards.

SUMMARY OF THE INVENTION

Systems and methods consistent with the principles of the present invention address the needs and drawbacks of past attempts by combining elements of both secured and unsecured credit card products. More specifically, systems and methods consistent with the invention provide a secured credit card product that is offered to a select group of potential customers and that includes a stated, maximum credit limit that a customer may qualify for after responding to the offer. The actual credit limit is determined not at the time of sending the offer, but after the response from the customer has been received. Ultimately, the actual credit limit will be determined based on each customer's credit rating at the application stage. As a result, the secured credit cardholder is provided with a credit limit that is more commensurate with their credit history and that is not restricted by any predetermined ratio or fixed, group amount. Further, systems and methods consistent with the principles of the present invention provide an increased response level by offering a secured credit card with a required security deposit and a stated maximum credit limit for which the potential customer may qualify.

According to an aspect of the invention, a list of potential customers is generated for each secured card product and offers are sent to each potential customer on the list. The offer may indicate both the required security deposit and the maximum credit limit that the customer may qualify for in exchange for the security deposit. When each customer response to the offer is received, the actual credit limit for the secured credit card is determined based on the individual's credit history and other factors, such as number of accounts, earning capacity, debt-to-income ratio and length of employment. After determining the credit limit, a customer account is established and the customer is notified of his/her new account. This notification may include providing the new account number and other pertinent account information, as well as issuing one or more secured credit cards represented with plastic card-like members.

In determining the list of potential customers, an analysis may be performed to determine whether the customer poses an acceptable level of risk and whether the customer can provide an acceptable level of profitability. Systems and methods consistent with the present invention may receive data from one or more financial clearinghouses to generate a list of potential customers. This data may be analyzed to perform a primary risk analysis of potential customers and to arrange potential customers into groups based on risk assessment. A separate determination may then be made as to the type of secured credit card product to offer each group. Thereafter, the secured credit card offers may be sent to each potential customer.

When a response to the offer is received from a customer, the issuer may re-evaluate the customer's credit information before determining the actual credit limit for the new account. Systems and methods consistent with the invention may receive the response to the offer from a customer and perform a secondary risk analysis of the customer to determine the credit limit for the secured credit card product based on, for example, additional information received in the response. Each customer's account may then be established in accordance with the determined credit limit and a notification can be sent to the customer to indicate the new account information.

In accordance with an aspect of the present invention, a method is provided for offering and providing a secured credit card product. The method preferably comprises: identifying potential customers for a secured credit card product; sending an offer for the secured credit card product to each potential customer, wherein the offer includes a stated security deposit and a stated, maximum credit limit that a potential customer may receive for the secured credit card product upon qualification; receiving each customer response to the offer for the secured credit card product; and establishing, in response to each received customer response, a customer account for the secured credit card product.

In the disclosed method, the step of establishing may comprise providing customer credit data and determining, based on the customer credit data, a credit limit for the secured credit card product associated with the customer account. In addition, the method may further include notifying a customer of the customer account and the credit limit for the secured credit card product associated with the customer account.

The disclose method may also include receiving a plurality of customer credit data from at least one financial clearinghouse and determining a list of potential customers for the secured credit card based on the plurality of customer credit data. In such a case, the step of identifying may further comprise arranging the list of potential customers into a plurality of groups and determining a secured credit card product to offer potential customers in each of the groups.

In accordance with another aspect of the invention, a computer program product is provided for offering and providing secured credit card products. The computer program product may comprise: computer-readable media having computer-readable code, wherein the computer program product comprises the following computer-readable program code for effecting actions in a computing platform: program code for identifying potential customers for a secured credit card product; program code for determining an offer for the secured credit card product to be sent to each potential customer, wherein the offer includes a stated security deposit and a stated, maximum credit limit that a potential customer may receive for the secured credit card product upon qualification; and program code for establishing, in response to each customer response to the offer, a customer account for the secured credit card product.

In the disclosed computer program product, the program code for establishing may comprise program code for determining, based on customer credit data, a credit limit for the secured credit card product associated with the customer account. Further, the computer program product may also comprise program code for generating a notification to a customer of the customer account and the credit limit for the secured credit card product associated with the customer account. In addition, the computer program code for identifying may comprise program code for determining a list of potential customers for the secured credit card based on a plurality of customer credit data provided from at least one financial clearinghouse, wherein the program code for identifying further comprises program code for arranging the list of potential customers into a plurality of groups and program code for determining a secured credit card product to offer potential customers in each of the groups.

According to yet another aspect of the invention, a system is provided for offering and providing a secured credit card product. The system may comprise: means for identifying potential customers for a secured credit card product; and means for determining an offer for the secured credit card product to be sent to each potential customer, wherein the offer includes a stated security deposit and a stated, maximum credit limit that a potential customer may receive for the secured credit card product. The disclosed system may also include means for receiving each customer response to the offer for the secured credit card product and means for establishing, in response to each received customer response, a customer account for the secured credit card product.

In the disclosed system, the means for establishing may comprise means for determining, based on customer credit data, a credit limit for the secured credit card product associated with the customer account. The disclosed system may also include means for generating a notification to a customer of the customer account and the credit limit for the secured credit card product associated with the customer account. Further, the means for identifying may comprise means for receiving a plurality of customer credit data from at least one financial clearinghouse and means for determining a list of potential customers for the secured credit card based on the plurality of customer credit data. Moreover, the disclosed system may be provided with means for arranging the list of potential customers into a plurality of groups and means for determining a secured credit card product to offer potential customers in each of the groups.

In accordance with still another aspect of the invention, a method is provided for offering and providing a secured credit card product. The disclosed method preferably comprises: sending an offer for a secured credit card product to a list of potential customers, wherein the offer including a stated security deposit and a stated, maximum credit limit that a potential customer may receive for the secured credit card product; receiving each customer response to the offer for the secured credit card product; and establishing, in response to each received customer response, a customer account for the secured credit card product.

In the disclosed method, the step of establishing may comprise providing customer credit data and determining, based on the customer credit data, a credit limit for the secured credit card product associated with the customer account. In addition, the method may further comprise notifying a customer of the customer account and the credit limit for the secured credit card product associated with the customer account. Further, the method may be implemented to include identifying the list of potential customers for the secured credit card product, wherein the identifying comprises receiving a plurality of customer credit data from at least one financial clearinghouse and determining the list of potential customers for the secured credit card based on the plurality of customer credit data.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Systems and methods consistent with the present invention protect credit card issuers while addressing the needs of its card holders by offering a credit card product with a stated maximum credit limit and a defined security deposit. The security deposit is required because of the inherent risk involved in providing credit to customers with poor or bad credit history. However, like traditional, unsecured credit cards, the present invention offers a credit card product that is attractive to customers in that it provides a variable credit limit that may reach a stated maximum upon qualification. The credit limit is determined by the issuer and is generally based on a number of non-exclusive factors, the most important of which are often the earning capacity and credit history of each potential customer. By tailoring the credit limit to potential customers based on their individual credit-worthiness, risk is minimized to the credit card issuer. Further, by offering the product with a stated maximum credit limit, a higher response level is provided as compared with conventional, secured credit card products. As a result, with the features of the present invention, a credit card issuer is capable of attracting a greater number of customers for a secured credit card product, including individuals who are not responsive to ratio or fixed line credit card products and who do not qualify for more traditional, unsecured credit card products.

The above-noted features and other aspects and principles of the present invention may be implemented in various system or network environments to provide automated computational tools to facilitate data collection and risk analysis. Such environments and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques. The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include both machine code, such as produced by compiler, and files containing a high level code that can be executed by the computer using an interpreter.

Figure 1:
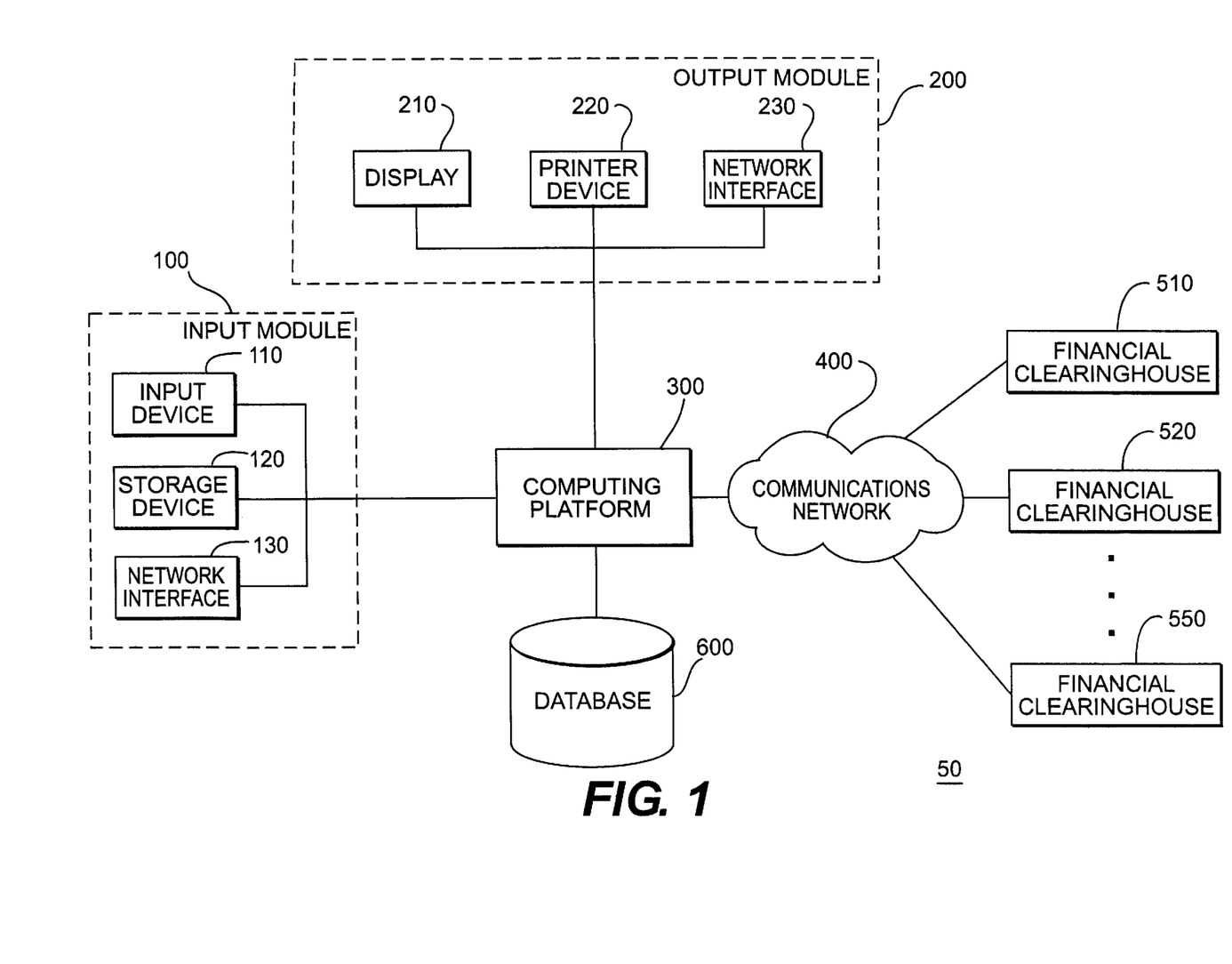
FIG. 1 illustrates an exemplary system environment in which the features of the present invention may be implemented.

By way of a non-limiting example, FIG. 1 illustrates a system environment 50 in which the features and principles of the present invention may be implemented. As illustrated in the block diagram of FIG. 1, system environment 50 includes an input module 100, an output module 200, a computing platform 300, a database 600, and one or more financial clearinghouses 510–550 that may be accessed through a communications network 400. Computing platform 300 is adapted to provide the necessary functionality and computing capabilities to analyze each customer's credit history or data provided through input module 100, or provided from one or more of the financial clearinghouses 510–550 through communications network 400. Credit history information may be accessed and analyzed based on commercially available sources (such as the FICO model from Fair, Isaac and Company, Inc.) and/or through financial clearinghouses 510–550 which may include the one or more of the major credit bureaus such as TRW/Experian, Equifax and TransUnion. The results of analyzing the data are provided as output from computing platform 300 to output module 200 for printed display, viewing or further communication to other system devices. Such output may include a mailing list of potential customers for each secured credit card product, a customer's credit or risk rating, and/or a customer's response or potential profitability level. Output from computing platform 300 can also be provided to database 600, which may be utilized as a persistent storage device for storing, for example, customer mailing lists and new credit card account information.

In the embodiment of FIG. 1, computing platform 300 preferably comprises a PC or mainframe computer for performing various functions and operations of the invention. Computing platform 300 may be implemented, for example, by a general purpose computer selectively activated or reconfigured by a computer program stored in the computer, or may be a specially constructed computing platform for carrying-out the features and operations of the present invention. Computing platform 300 may also be implemented or provided with a wide variety of components or subsystems including, for example, one or more of the following: one or more central processing units, a co-processor, memory, registers, and other data processing devices and subsystems. As indicated above, computing platform 300 communicates or transfers customer and credit data to and from one or more financial clearinghouses 510–550 through communications network 400. Communications network 400 may comprise, alone or in any suitable combination, a telephony-based network (such as a PBX or POTS), a local area network (LAN), a wide area network (WAN), a dedicated intranet, and/or the Internet. Further, any suitable combination of wired and/or wireless components and systems may be incorporated into communications network 400. Computing platform 300 also communicates or transfers customer and credit data to and from input module 100 and output module 200 through the use of direct connections or communication links, as illustrated in FIG. 1. Alternatively, communication between computing platform 300 and modules 100, 200 can be achieved through the use of a network architecture (not shown) similar to that described above for communications network 400. By using dedicated communication links or a shared network architecture, computing platform 300 may be located in the same location or at a geographically distant location from input module 100 and/or output module 200.

Input module 100 of system environment 50 may be implemented with a wide variety of devices to receive and/or provide the data as input to computing platform 300. As illustrated in FIG. 1, input module 100 includes an input device 110, a storage device 120, and/or a network interface 130. Input device 110 may comprise a keyboard, a mouse, a disk drive or any other suitable input device for providing customer or credit data to computing platform 300. Memory device 120 may be implemented with various forms of memory or storage devices, such as read-only memory (ROM) devices and random access memory (RAM) devices. Storage device 120 may include a memory tape or disk drive for reading and providing customer or credit data on a storage tape or disk as input to computing platform 200. Input module 100 may also include network interface 130, as illustrated in FIG. 1, to receive data over a network (such as a LAN, WAN, intranet or the Internet) and to provide the same as input to computing platform 300. For example, network interface 130 may be connected to a public or private database over a network for the purpose of receiving and transferring customer or credit data to computing platform 300.

As illustrated in FIG. 1, output module 200 includes a display 210, a printer device 220, and/or a network interface 230 for receiving the results provided as output from computing module 200. As indicated above, the output from computing platform 300 may include mailing lists of potential customers for credit card products, credit or risk ratings for potential customers, and/or response or potential profitability levels for potential customers. The output from computing platform 300 may be displayed or viewed through display 210 (such as a CRT or LCD) and printer device 220. If needed, network interface 230 may also be provided to facilitate the communication of the results from computer platform 300 over a network (such as a LAN, WAN, intranet or the Internet) to remote or distant locations for further analysis or viewing. In either case, the output from output module 200 can be used by the credit card issuer to generate, for example, the necessary mail offers (which can be either physical or electronic mail offers) for potential customers on the list(s) determined for each secured credit card product. The output from output module 200 can also be used for other purposes, such as internal reports or monitoring.

In accordance with the principles of the present invention, an exemplary process for selecting prospective customers and determining the product and credit limit to offer each customer will now be described with reference to FIGS. 2 and 3.

Figure 2:
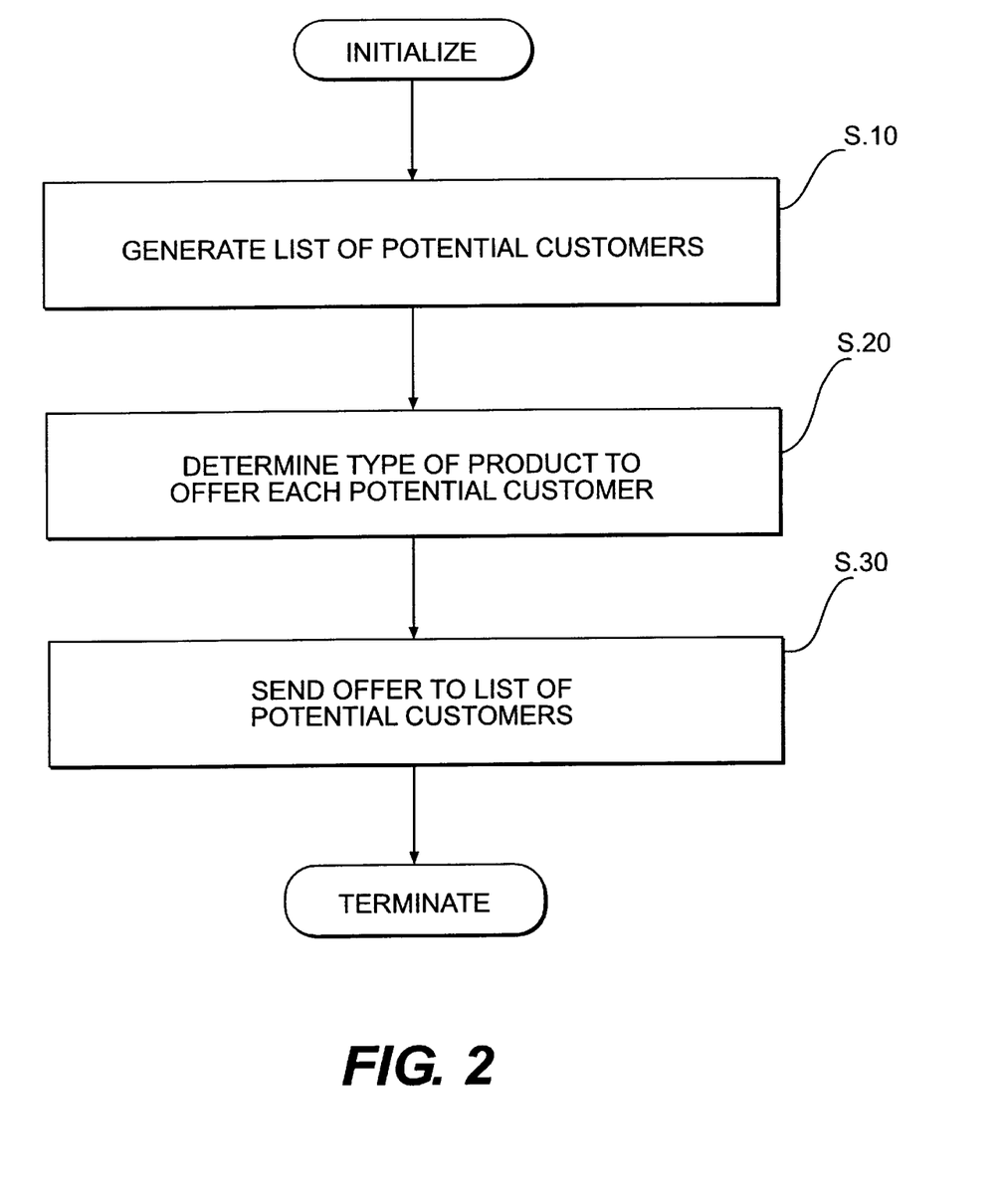
FIG. 2 is an exemplary flowchart of a process for selecting potential customers to send credit card product offers, consistent with the principles of the present invention.

FIG. 2 is an exemplary flowchart of a process for selecting prospective customers to send product offers in a manner consistent with the principles of the invention. As illustrated in FIG. 2, the credit card issuer first generates a list of potential customers (step S.10). For example, using computing platform 300 or a similar device the issuer identifies potential customers that match a certain risk profile based on information provided from input module 100 and/or one or more financial clearinghouses 510–550. As part of this step, the issuer may identify potential customers based on their past credit history, number of accounts, prior declarations of bankruptcy, payment delinquencies, etc. These factors can be analyzed using a commercially available credit scoring model (such as the FICO model) that is implemented alone or in any suitable combination with other risk analysis models. Alternatively, one or more customized processes or risk models may be employed by computing platform 300 to analyze each customer's credit history and data to generate the list of potential customers. For secured credit card offers, customers determined to have an excellent or good credit rating may be eliminated from consideration, while potential customers with poor credit (within a reasonable risk range) placed on the list for the secured credit card product.

Based on the credit information of each potential customer, the issuer then determines the type of product to offer each customer (step S.20). The type of secured credit card product to offer a customer can be selected so that the required security deposit and stated maximum credit limit is commensurate with each customer's credit history and risk level. If more than one type of secured credit card product is to be offered by the issuer, then potential customers on the list may be matched with the product that provides the best match in terms of risk level and/or profit level for the credit card issuer. For example, if two types of secure products are to be offered that have the same required security deposit (e.g., $49) and differ only in the maximum stated credit limit, then those customers identified on the list who have a relatively higher credit rating may be offered the product with the higher maximum stated credit limit (e.g., $,1000), while those customer who have a relative lower credit rating are offered the product with the lower maximum stated credit limit (e.g., $500).

After determining the type of product to offer each potential customer, the issuer sends the offers to the list of potential customers (step S.30). The offers that are sent to potential customers may be sent in the form of solicitation or offer letters through the mail and/or they may be electronically transmitted (e.g., by e-mail) to the potential customers on the list. The sending of offers may be carried out by the credit card issuer or may be performed by a third party contracted by the credit card issuer.

Figure 3:
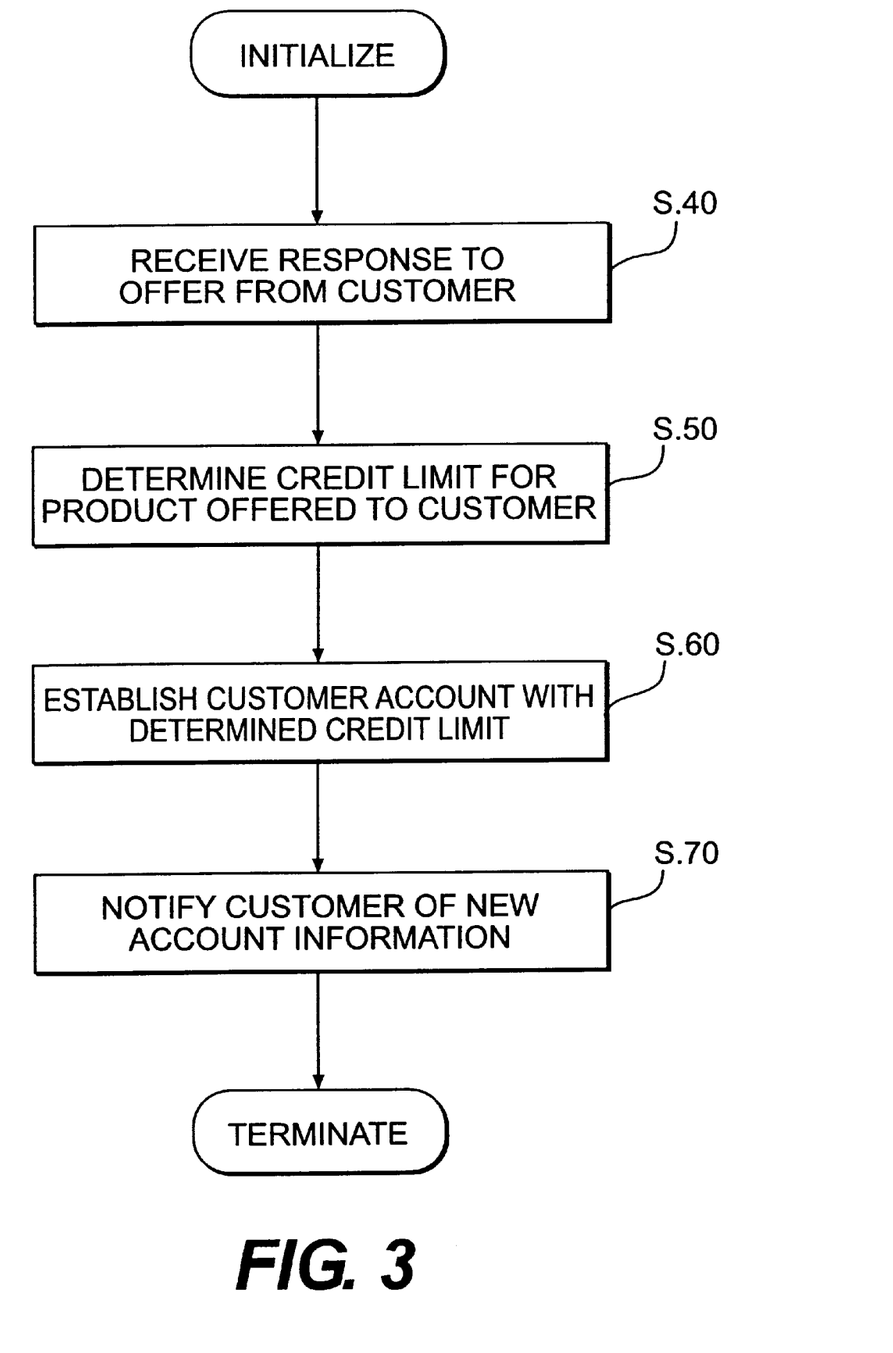
FIG. 3 is an exemplary flowchart of a process for screening the received credit card product offers, in accordance with the principles of the invention.

FIG. 3 is an exemplary flowchart of a process for screening responses to credit card product offers in a manner consistent with the principles of the present invention. As shown in FIG. 3, the credit card issuer first receives the response to the credit card offer from a customer (step S.40). Information provided by a customer in a response may be provided as input to computing platform 300 by input module 100 or through communications network 400. As further described below, this information may be analyzed by computing platform 300 when processing the new account and determining the appropriate credit limit for the customer. If payment for the required security deposit is included by a customer with the response to the product offer, the payment may be deposited in an account and recorded by the issuer. The response from the customer may be in the form of a completed application or letter that is received by the issuer through the mail. Alternatively, responses from customers may be received electronically through a communications network (such as communications network 400) or a network interface (such as network interface 130 of input module 100) and may be in the form of an electronic application or message.

After receiving the response from a customer, an analysis is performed to determine the actual credit limit for the product offered to the customer (step S.50). This analysis can be performed with computing platform 300 by re-evaluating the customer's risk with a suitable risk model or more comprehensive process. As part of this step, the customer's credit history can be re-evaluated alone or in combination with the information received in the customer's response to the issue. The information in the customer's response may indicate, for example, a customer's income, assets and/or debt obligations. Information on a customer's response, such as a customer's full legal name, current address and/or social security number, may also be utilized by the issuer in order to gather more accurate and up-to-date data on the customer's credit history from one or more of the financial clearinghouses 510–550. Computing platform 300 may also make a comparison between the current and previous risk evaluation to derive an overall risk assessment and the credit limit for the offered product. By performing this analysis, computing platform 300 can determine whether the customer qualifies for the maximum, stated credit limit or whether a lower credit limit is more appropriate based on the customer's credit worthiness.

As further illustrated in FIG. 3, after determining the credit limit for a customer, a customer account is set-up and established (step S.60). The customer account may be set-up by computing platform 300 based on the credit limit determined for the customer. As part of this process, information relating to the account (e.g., customer name, address, account number, credit limit, etc.) may be stored in database 600 by computing platform 300. A credit card in the form of a plastic-card like member may also be generated by the credit card issuer. Following step S.60, the customer is notified of their new account information, including the determined credit limit of the secure credit card product associated with the account (step S.70). Notification to each customer may be sent through the mail and/or include an electronic notification message (such as an e-mail). Notification may also include providing one or more plastic credit card members associated with the customer's account for conducting transactions and purchases.

In accordance with the principles of the present invention, another exemplary process for selecting prospective customers and determining the product and credit limit to offer customers will now be described with reference to FIGS. 4 and 5.

Figure 4:
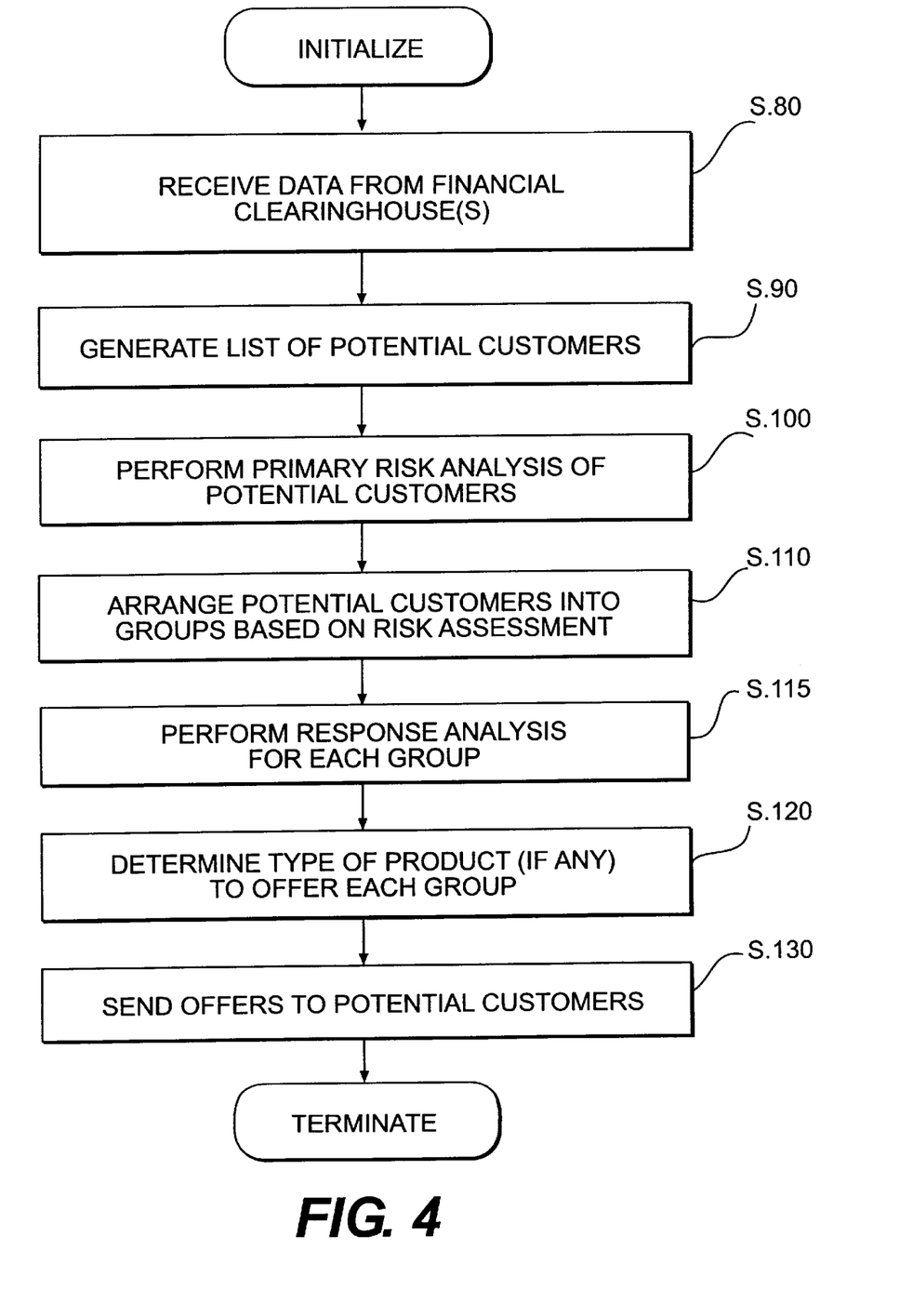
FIG. 4 is exemplary flowchart of another process for selecting prospective customers to send credit card product offers, in accordance with the features of the present invention.

FIG. 4 is an exemplary flowchart of another process for selecting prospective customers to send product offers in a manner consistent with the principles of the invention. As illustrated in FIG. 4, the first step in the selection process is for the credit card issuer to receive data from one or more financial clearinghouses 510–550 (step S.80). As indicated above, financial clearinghouses 510–550 may include one or more of the major credit bureaus such as TRW/Experian, Equifax and TransUnion, and communicate data with computing platform 300 through communications network 400. Using this data, a list of potential customers is generated for the secured credit card products (step S.90). The list of potential customers can be generated by identifying individuals that fall within a predetermined range of acceptable risk or credit worthiness. For secured credit cards, this "broad" cut to identify potential customers can be performed by computing platform 300 using a commercially available risk model (such as the FICO model) or a customized process that analyzes credit history data and other credit-related factors. The goal of this broad cut is to eliminate unwanted candidates (such as those with excellent or good credit history), while identifying all potential customers that are more likely to be responsive to a secured credit card offer (such as those with a poor or bad credit history).

As illustrated in FIG. 4, the next step in the prospect selection process is to perform a primary risk analysis on the list of potential customers (step S.100). This risk analysis may be performed by computing platform 300 on each potential customer based on a risk model that is particularly suited for individuals with poor or bad credit. Customer and credit-related data may be processed by such a risk model to generate a risk score for each potential customer based on various factors, such as bankruptcy claims, late payment history, payment delinquencies, etc. After determining a risk score for each potential customer, the customers are then divided into groups by computing platform 300 in accordance with their risk scores (step S.110). In this regard, customers may be arranged in groups of risk scores that range from low risk scores to high risk scores. By way of a non-limiting example, computing platform 300 may arrange potential customers into eight different groups of risk scores.

Following the grouping of customers, each group of customers is analyzed using a response model to generate a response score (step S.115). The response score provides an indication of the likelihood of a response from the group to a secured credit card product. The response model may be based on various credit-related factors, including income, number of accounts, debt, etc. Correlations or trends based on historical data can also be incorporated into the response model in order to provide a response score that more accurately indicates the propensity of each group to respond to a secured credit card offer.

As further illustrated in FIG. 4, the response scores for each group are then analyzed with the risk scores to determine which secured credit card product (if any) to offer each of the designated groups (step S.120). The goal of this analysis is to determine which secured credit card product should be offered to each group so that the greatest profit may be achieved by the credit card issuer. The exact product to offer each group of customers may depend on the cost of sending the offers (as measured by the response level) and the worth of the customer (as indicated by the risk level). Generally, the lower risk score is for a group the greater the worth of the group of customers will be to the issuer, and vice versa. The risk and worth of each customer group may be analyzed for each secure credit card product offered by the issuer. In addition, based on the response score for a group, an estimate can be made as to the cost of acquiring new accounts for each group. By analyzing the potential profit for each secured card product through a combination of the risk score and the response score, a determination is made regarding the best product to offer each group of potential customers. Of course, if the issuer only offers one type of secured card product, step S. 120 may determine to offer this product to each group of customers or only to offer the product to groups that are determined to likely provide a profit to the issuer. In addition, if any group is determined to be unprofitable for any secured credit card product offered by the issuer, then the group may be excluded from consideration and not offered a secured credit card product.

After identifying the appropriate product (if any) to offer each group, the issuer sends corresponding offers to the potential customers of each group (step S.130). The offers that are sent to potential customers may be sent in the form of a solicitation or offer letter through the mail and/or they may be electronically transmitted (e.g., by e-mail) to the potential customers of each group. The sending of offers may be carried out by the credit card issuer or may be performed by a third party contracted by the issuer. If the issuer determines that a particular group does not meet the profitability or risk criteria for the considered credit card products, those potential customers may not receive any secured credit card offer or may receive an offer for a different type of credit card product from the issuer (if available).

Figure 5:
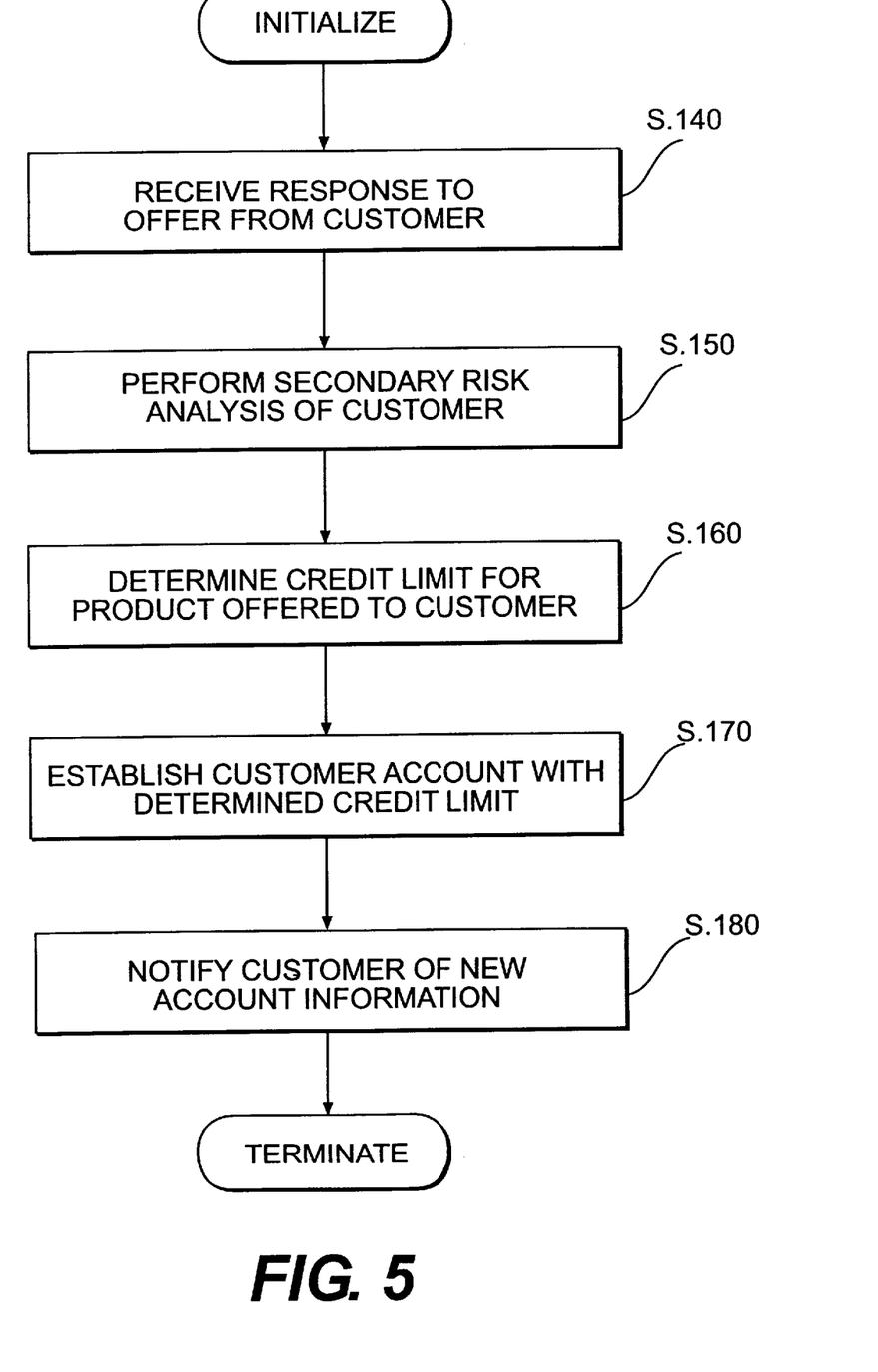
FIG. 5 is an exemplary flowchart of another process for screening the received credit card product offers, consistent with the principles of the present invention.

FIG. 5 is an exemplary flowchart of another process for screening received credit card product offers in a manner consistent with the principles of the invention. As indicated in FIG. 5, after receiving a response to an offer from a customer (step S.140), a secondary risk analysis is performed on each customer (step S.150). This secondary risk analysis may be performed by computing platform 300 to re-evaluate the customer's risk. As part of this step, the customer's credit history can be re-evaluated alone or in combination with the information received in the response. The information in the customer's response may indicate, for example, a customer's income, assets and/or debt obligations. Information on a customer's response or application, such as a customer's full legal name, date of birth, current address and/or social security number, may also be utilized by the issuer to gather more accurate and up-to-date data on the customer's credit history from one or more of the financial clearinghouses 510–550. Other application information, such as a customer's response to various questions (such as renting status, car ownership status, income, etc.) can also be used to analyze risk. Computing platform 300 may also make a comparison between the current and previous risk evaluation to derive an overall risk assessment or score for each customer. By performing this analysis, computing platform 300 can determined whether the customer qualifies for the maximum, stated credit limit or whether a lower credit limit is more appropriate based on the customer's credit worthiness. Thus, after performing the secondary risk analysis, the credit limit for the product offered to the customer is determined (step S.160). Thereafter, the credit card issuer establishes a new customer account with the determined credit limit (step S.170) and notifies the customer of the new account information (step S.180).

As indicated above with reference to FIG. 3, the customer account may be set-up by computing platform 300 based on the credit limit determined for the customer. As part of step S.160, information relating to the new customer account (e.g., customer name, address, account number, credit limit, etc.) may be stored in database 600 by computing platform 300. When notifying the customer of the account at step S.180, the new account information (including the determined credit limit) may be indicated to the customer. A credit card in the form of a plastic-card like member may also be generated by the credit card issuer and provided as part of the notification to the customer.

The exemplary flowchart of FIG. 5 described above assumes that the customer's response to the offer fulfills all of the issuer's requirements. However, if the customer does not pay the required security deposit in full, the issuer may request the deposit from the customer before granting the new account. Similarly, if the customer sends a check or another payment instrument for the security deposit that does not clear, the credit card issuer may either restrict the account if the credit card product has been sent or if it has not been sent the issuer may delay opening of the account until payment of the deposit is satisfied.

It will be apparent to those skilled in the art that various modifications and variations can be made to the invention without departing from the scope or spirit of the invention. For example, in order to increase the likelihood that a customer will qualify for at least a minimum credit limit when the response is received, secured credit card offers of the present invention may be held open or remain valid only for a predetermined period of time. If a response to an offer is received past the expiration date, the credit card issuer may deny the new account request, or re-evaluate and approve the account only if the customer still has the necessary qualifications for the minimum credit limit. If, however, the customer responds to an offer before the expiration date and has a very poor credit rating after the application is returned, the issuer may be obligated to provide the secured credit card product that was offered. In such a case, the issuer may minimize risk by providing the customer with only the minimum credit limit allowed for the product being offered.

Other modifications and embodiments of the invention will be apparent to those skilled in the art from consideration of the specification and practice of the invention disclosed herein. For example, the features and aspects of FIGS. 2, 3, 4 and 5 may be implemented alone or in any suitable combination by a credit card issuer to offer and provide secured credit card products. Therefore, it is intended that the specification and examples be considered as exemplary only, with a true scope and spirit of the invention being indicated by the following claims.

What is claimed is:

1. A method for offering and providing a secured credit card product, said method comprising:

identifying potential customers for a plurality of secured credit card product types;

selecting, from said plurality of secured credit card product types, the type of secured credit card product to offer each potential customer;

sending an offer for the selected secured credit card product to each potential customer, said offer including a stated security deposit and a stated, maximum credit limit that a potential customer may receive for the secured credit card product upon qualification;

receiving each customer response to the offer for the secured credit card product; and establishing, in response to each received customer response, a customer account for the secured credit card product.

2. A method according to claim 1, wherein said establishing comprises providing customer credit data and determining, based on the customer credit data, a credit limit for the secured credit card product associated with the customer account.

3. A method according to claim 2, wherein said method further comprises notifying a customer of the customer account and the credit limit for the secured credit card product associated with the customer account.

4. A method according to claim 1, wherein said identifying comprises receiving a plurality of customer credit data from at least one financial clearinghouse and determining a list of potential customers for the secured credit card based on the plurality of customer credit data.

5. A method according to claim 4, wherein said identifying further comprises arranging the list of potential customers into a plurality of groups.

6. A computer program product for offering and providing secured credit card products, the computer program product comprising computer-readable media having computer-readable code, the computer program product comprising the following computer-readable program code for effecting actions in a computing platform:

program code for identifying potential customers for a plurality of secured credit card product types;

program code for selecting, from said plurality of secured credit card product types, the type of secured credit card product to offer each potential customer;

program code for determining an offer for the selected secured credit card product to be sent to each potential customer, said offer including a stated security deposit and a stated; maximum credit limit that a potential customer may receive for the secured credit card product upon qualification; and program code for establishing, in response to each customer response to the offer, a customer account for the secured credit card product.

7. A computer program product according to claim 6, wherein said program code for establishing comprises program code for determining, based on customer credit data, a credit limit for the secured credit card product associated with the customer account.

8. A computer program product according to claim 7, further comprising program code for generating a notification to a customer of the customer account and the credit limit for the secured credit card product associated with the customer account.

9. A computer program product according to claim 6, wherein said program code for identifying comprises program code for determining a list of potential customers for the secured credit card based on a plurality of customer credit data provided from at least one financial clearinghouse.

10. A computer program product according to claim 9, wherein said program code for identifying further comprises program code for arranging the list of potential customers into a plurality of groups.

11. A system for offering and providing a secured credit card product, said system comprising:

means for identifying potential customers for a plurality of secured credit card product types;

means for selecting, from said plurality of secured credit card product types, the type of secured credit card product to offer each potential customer; and means for determining an offer for the selected secured credit card product to be sent to each potential customer, said offer including a stated security deposit and a stated, maximum credit limit that a potential customer may receive for the secured credit card product.

12. A system according to claim 11, further comprising means for receiving each customer response to the offer for the secured credit card product and means for establishing, in response to each received customer response, a customer account for the secured credit card product.

13. A system according to claim 12, wherein said means for establishing comprises means for determining, based on customer credit data, a credit limit for the secured credit card product associated with the customer account.

14. A system according to claim 13, further comprising means for generating a notification to a customer of the customer account and the credit limit for the secured credit card product associated with the customer account.

15. A system according to claim 11, wherein said means for identifying comprises means for receiving a plurality of customer credit data from at least one financial clearinghouse and means for determining a list of potential customers for the secured credit card based on the plurality of customer credit data.

16. A system according to claim 15, further comprising means for arranging the list of potential customers into a plurality of groups.

17. A method for offering and providing a plurality of secured credit card product types, said method comprising:

selecting, from said plurality of secured credit card product types, the type of secured credit card product to offer each customer;

sending an offer for the selected secured credit card product to a list of potential customers, said offer including a stated security deposit and a stated, maximum credit limit that a potential customer may receive for the secured credit card product;

receiving each customer response to the offer for the secured credit card product; and establishing, in response to each received customer response, a customer account for the secured credit card product.

18. A method according to claim 17, wherein said establishing comprises providing customer credit data and determining, based on the customer credit data, a credit limit for the secured credit card product associated with the customer account.

19. A method according to claim 18, wherein said method further comprises notifying a customer of the customer account and the credit limit for the secured credit card product associated with the customer account.

20. A method according to claim 17, further comprising identifying the list of potential customers for the secured credit card product, wherein said identifying comprises receiving a plurality of customer credit data from at least one financial clearinghouse and determining the list of potential customers for the secured credit card based on the plurality of customer credit data.

21. A method according to claim 20, wherein said identifying further comprises arranging the list of potential customers into a plurality of groups.

22. A method according to claim 17, wherein said establishing comprises providing customer credit data and determining, based on the customer credit data, whether a customer qualifies for the stated, maximum credit limit for the secured credit card product.

23. A method according to claim 5, wherein said selecting comprises performing a response analysis for each group and determining the type of secured credit card product to offer each group.

24. A method according to claim 23, wherein said performing a response analysis comprises using a response model to generate a response score.

25. A method according to claim 24, wherein said selecting comprises using the response score to determine the type of secured credit card product to offer.

26. A computer program product according to claim 10, wherein said program code for selecting comprises program code for performing a response analysis for each group and determining the type of secured credit card product to offer each group.

27. A computer program product according to claim 26, wherein said program code for performing a response analysis comprises program code for using a response model to generate a response score.

28. A computer program product according to claim 27, wherein said program code for selecting comprises program code for using the response score to determine the type of secured credit card product to offer.

29. A system according to claim 16, wherein said means for selecting comprises means for performing a response analysis for each group and determining the type of secured credit card product to offer each group.

30. A system according to claim 29, wherein said performing means comprises means for using a response model to generate a response score.

31. A system according to claim 30, wherein said selecting means comprises means for using the response score to determine the type of secured credit card product to offer.

32. A method according to claim 21, wherein said selecting comprises performing a response analysis for each group and determining the type of secured credit card product to offer each group.

33. A method according to claim 32, wherein said performing a response analysis comprises using a response model to generate a response score.

34. A method according to claim 33, wherein said selecting comprises using the response score to determine the type of secured credit card product to offer.

* * * * *